UNITED STATES PATENT OFFICE.

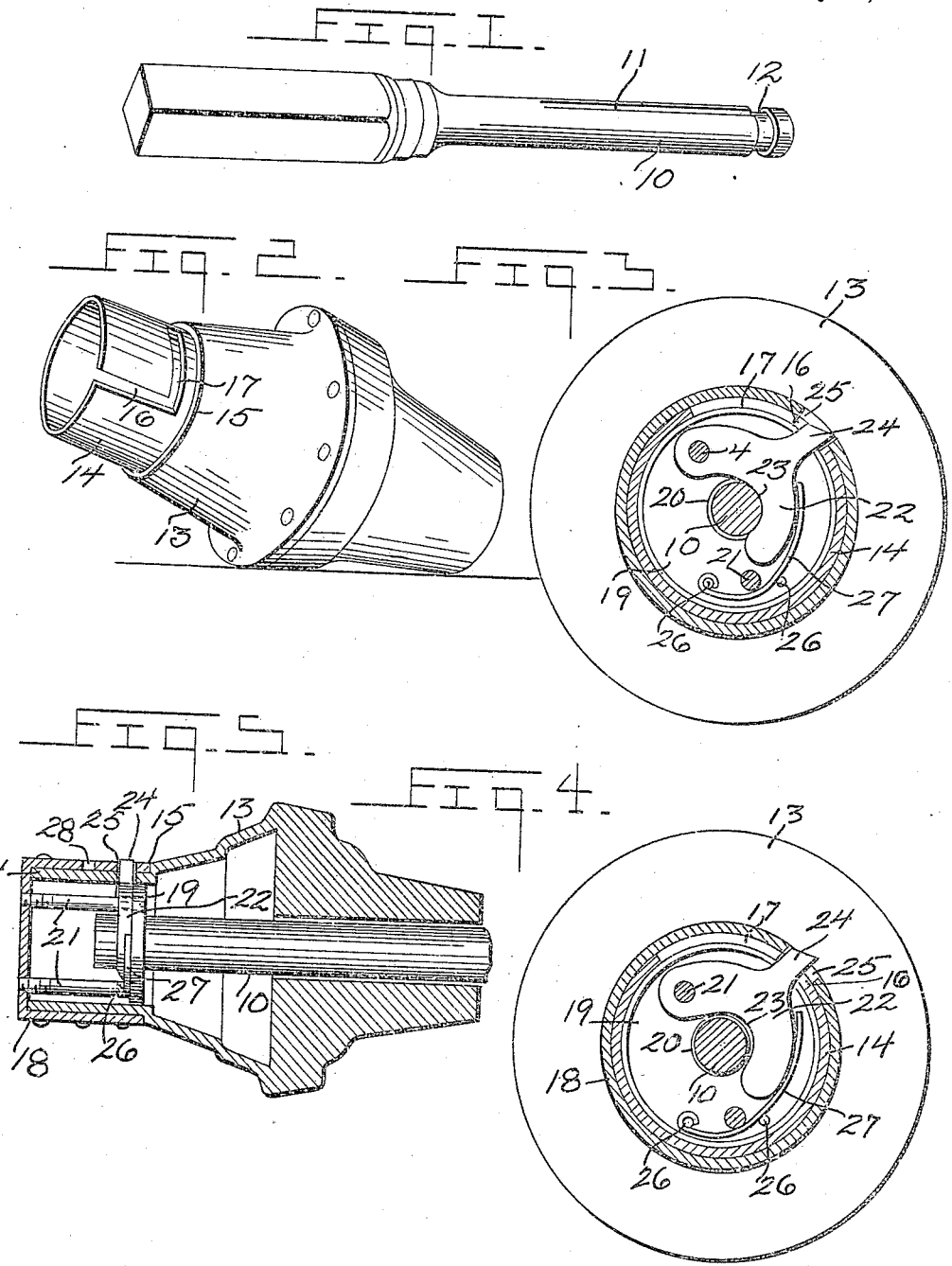

GEORGE LOCHHEAD, OF LOS ANGELES, CALIFORNIA.

WAGON-NUT.

958,262.  Specification of Letters Patent.  Patented May 17, 1910.

Application filed November 15, 1909. Serial No. 528,207.

*To all whom it may concern:*

Be it known that I, GEORGE LOCHHEAD, a citizen of the United States, residing at Los Angeles, in the county of Los Angeles and State of California, have invented certain new and useful Improvements in Wagon-Nuts, of which the following is a specification.

This invention relates to carriages and wagons, and more particularly to a novel method of retaining wheels upon spindles.

A particular object of the invention is to provide a device by which the necessity for the use of threaded nuts will be obviated, and whereby the liability of accidental disengagement of a wheel from a spindle will be obviated.

Another object is to provide such a device which is arranged for secure locking engagement upon an axle without the necessity for using special tools or implements of any kind.

Another object is to provide such a device serving as a reservoir for lubricants and adapted to facilitate and insure the proper lubrication of a vehicle to which it is attached.

Other objects and advantages will be apparent from the following description, and it will be understood that changes in the specific structure shown and described may be made within the scope of the claims without departing from the spirit of the invention.

In the drawings forming a portion of this specification, and in which like numerals of reference indicate similar parts in the several views, Figure 1 is a perspective view of a spindle for use with the device, Fig. 2 is a similar view of the outer end of a hub arranged for use with the device, Fig. 3 is a cross sectional view of an axle equipped with this invention engaged upon a spindle, in engaged position, Fig. 4 is a similar view showing the device in disengaged position, Fig. 5 is a longitudinal sectional view of the extremity of a spindle and hub having the device engaged thereon.

Referring to the drawings, there is shown a spindle 10, having a longitudinally extending oil channel 11 formed upon its upper side, and having a peripherally extending groove 12 spaced from its ends and into which the groove 11 opens. Engaged revolubly upon the spindle 10, there is a hub 13 having the sleeve 14 extending therefrom at the inner end of which adjacent the hub, there is a shoulder 15. The sleeve 14 has formed therein a longitudinally extending slot 16 at the inner end of which there is a circumferential extension 17. Engaged slidably over the sleeve 14, there is a cap member 18, carrying an annular support 19 adjacent its open end having a circular opening 20 therethrough adapted for slidable engagement over the outer end of the spindle 10.

The cap is adapted to be slidably engaged over the sleeve 14 to abut snugly against the shoulder 15 as shown, with the annular member 19 disposed adjacent to the groove 12. In order to allow this operation, it will be apparent that the member 19 is disposed with its periphery in spaced relation with the inner surface of the sleeve 18, being carried upon suitable bolts 21 extending through the annular member and the inner end of the cap. Pivoted upon one of the bolts, there is a pawl 22, having a semicircular notch 23 on its inner side and adapted to lie normally snugly in the groove 12 for sliding movement therein during the rotation of the wheel. Upon its outer side, the dog 22 is provided with a head 24 extending radially outwardly of the annulus 19 and through a suitable opening 25 formed in the cap. Spaced pins 26 are carried by the annulus 19 adjacent one of the bolts 21 and engaged on one of these there is a suitable band spring 27 confined between the bolt and other pin to bear against the pawl 22 and hold it normally in snug engagement with the groove.

To secure the wheel upon the axle, the wheel is first presented over the spindle in the usual manner, after which the cap 18 is presented slidably over the outer end of the hub, the head 24 being presented slidably in the slots 16, the cap being rotated slightly to the right to engage the head against the side of the slot and lift the pawl to allow its passage over the end of the spindle and upon reaching the groove 12, the pawl 22 may snap thereinto under action of the spring 27. Thus the tendency of the wheel to come off will be resisted by the pawl which is held upon the axle by engagement with the groove in the spindle. When it is desired to disengage the wheel, the cap is slightly rotated to bring the forward edge of the head 24 into engagement with the side of the slot 16, which will lift the pawl 22 out of engagement with the groove 12 against the action of the spring 27 and allow the cap 18 to be pulled slidably from the hub and spindle, leaving the wheel also free for removal. A suitable opening 28 is formed through the cap for the introduction of lubricants, which may be closed by any suitable method.

What is claimed is:

1. A device of the class described comprising a hub member having a longitudinal slot therein provided with a lateral extension at its inner end, a spindle member engaged revolubly in the hub member and having a peripheral annular groove in registry with the lateral extension, and a cap member slidable upon the hub and carrying a spring pressed pawl member tending to engage snugly in the groove and adapted to be lifted from engagement therewith under rotation of the cap upon the hub.

2. An article of the class described comprising a spindle member having a peripheral groove spaced from its outer end, a hub member revolubly engaged thereon and having an extension provided with a longitudinal slot having a lateral extension at its inner end in registry with the groove, and a cap member slidably engaged upon the hub and carrying a spring pressed pawl member resiliently engaged in the groove, and having an extension projecting through the slot, and adapted for engagement with the sides of the slot to lift the pawl out of the groove upon rotation of the cap upon the hub.

3. A device of the class described comprising a hub member having a longitudinal slot therein provided with a lateral extension, a spindle member engaged revolubly in the hub member and having a peripheral annular groove in registry with the lateral extension, and a cap member slidable upon the hub and carrying a spring pressed pawl member tending to engage snugly in the groove, and adapted to engage the side of the slot and be lifted from engagement therewith under rotation of the cap upon the hub.

In testimony whereof I affix my signature, in presence of two witnesses.

GEORGE LOCHHEAD.

Witnesses:
JAMES HODGE,
H. D. WINTERS.